Aug. 1, 1967 T. M. BISHOP 3,333,863
WHEEL STABILIZER
Filed June 21, 1965
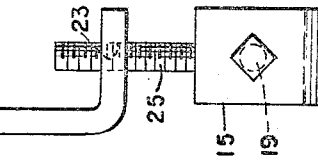
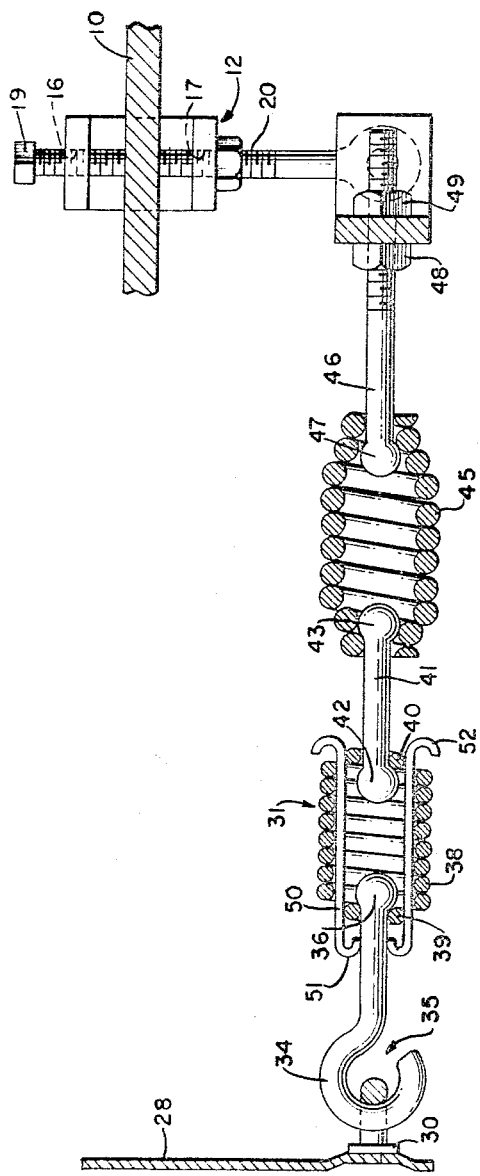
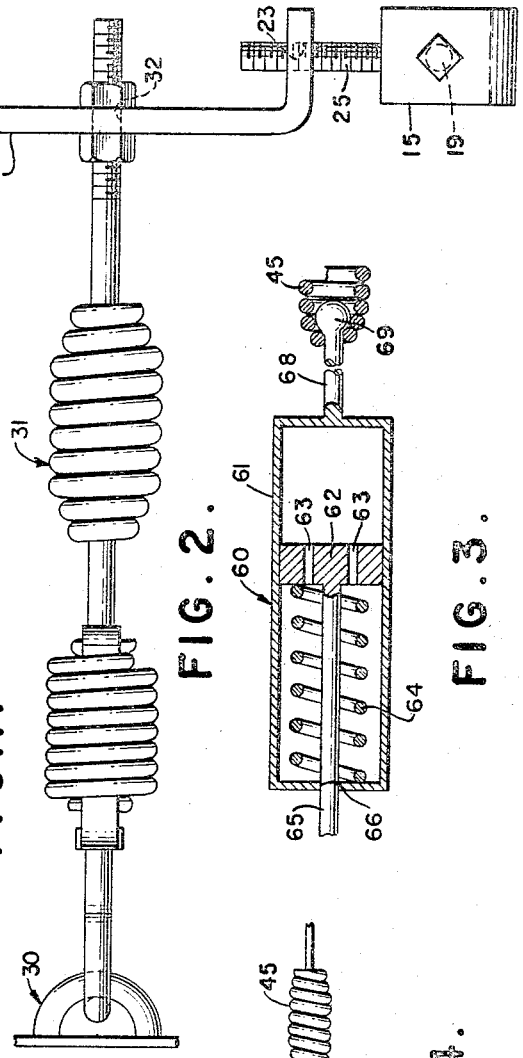
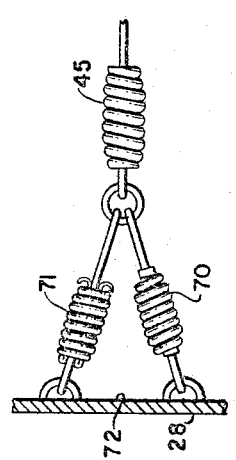
INVENTOR
Thomas M. Bishop
BY Newton, Hopkins, Jones & Ormsby
ATTORNEY

United States Patent Office 3,333,863
Patented Aug. 1, 1967

3,333,863
WHEEL STABILIZER
Thomas M. Bishop, Cedartown, Ga., assignor of one-third each to E. Lamar Gammage, Jr., and T. L. Mullen, both of Cedartown, Ga.
Filed June 21, 1965, Ser. No. 465,678
8 Claims. (Cl. 280—94)

This invention relates to wheel stabilizers for vehicles such as automobiles, trucks and buses or the like, and is more particularly related to a method and apparatus of stabilizing the steerable wheels of a heavy vehicle so that the wheels tend to stay in alignment with each other without lateral deviations and "shimmy" due to worn wheel bearings, etc., and to return the steerable wheels of the vehicle to alignment with the fixed wheels.

In today's high speed operation of automotive vehicles it is highly desirable for the vehicle to have its front steerable wheels perfectly aligned and fail safe, without any slack or shimmy due to worn wheel bearings and other worn steering gear parts in order to protect the passengers of the vehicle and the passengers of other vehicles on the road from disaster. However, it has been found that after a period of time the continuous vibrations encountered by the steering mechanism of a vehicle causes severe wear and damage to the steering components such that the steering mechanism becomes loose and unreliable, and in some instances even dangerous. The construction of steering mechanism for a heavy vehicle necessitates the wheels being connected to the vehicle with a cantilever arrangement such that the weight of the vehicle constantly bears down on the wheels so as to tend to pivot the wheels outwardly, as if to "bow" the wheels out. The function is emphasized, of course, when the vehicle is heavily loaded or when the vehicle hits an obstruction in its path. Because of this necessary construction the steering mechanism of a vehicle is considered to be its most vulnerable portion of its non-motive components since it is especially subject to rapid and excessive wear, even under normal operating conditions.

Accordingly, this invention provides a method and apparatus for minimizing the wear on the steering components of a heavy vehicle by counteracting the effect of the weight of the vehicle on the steering mechanism. The backing-plate or wheel cover of each steerable wheel is biased inwardly at its bottom dead center so that the torque effect normally felt by the kingpin and other steering components is counteracted, and effectively neutralized.

Thus, it is an object of this invention to provide a method for counteracting the torque effects exerted by the weight of a heavy vehicle on the kingpin and other steering elements.

Another object of this invention is to provide apparatus to minimize the effect of vehicle weight in wearing out the steering components of its steerable wheels.

Another object of this invention is to provide an apparatus for attachment between the backing-plate of the wheel of an automobile and the frame of the automobile so as to urge the bottom portion of the wheel inwardly of the automobile.

Another object of this invention is to provide a method for maintaining the steerable wheels of an automobile in alignment so as to render the vehicle safe to operate at high speeds and to minimize tire wear.

Another object of this invention is to provide an apparatus for maintaining the steerable wheels of a vehicle in their original pre-set aligned condition, to minimize the wear on the steering components of the vehicle, and to enable the wheels of the vehicle to maintain full traction when operated around a curve at high speeds.

Other objects, features and advantages of the present invention will be apparent upon inspection of the following specification, taken in conjunction with the accompanying drawings, in which:

FIG. 1 is an elevational view of the wheel equalizer, with parts shown in cross section, and showing its connection to the backing-plate of a steerable wheel of an automobile and to the frame of an automobile.

FIG. 2 is a plan view of the wheel equalizer as shown in FIG. 1.

FIG. 3 shows another form of the invention, wherein one of the springs of the wheel equalizer is replaced with a spring loaded shock absorber.

FIG. 4 is another form of the invention, wherein one of the springs of the wheel equalizer is replaced by two springs attached at points spaced apart on the wheel backing-plate.

Referring now more particularly to the drawings, wherein like numerals will designate like parts throughout several views, the numeral 10 designates a portion of the frame of an automobile, such as the A-frame of an automobile. A clamp device 12 is constructed to be attached to the A-frame and comprises two frame clamps 14 and 15 of a U-shaped configuration. The legs of the U-shaped frame clamps 14 and 15 define threaded apertures 16 and 17 in alignment with each other. The clamps 14 and 15 are positioned over portions of the A-frame and a screw, such as a square headed set screw 19, is inserted through the apertures 16 above the A-frame, and the eyebolt 20 is threaded through the aperture 17 below the A-frame. The eyebolt 20 and the set screw 19 are threaded through their respective apertures until they positively engage the A-frame with enough pressure so that they are firmly and securely attached to the A-frame.

A U-shaped bracket 22 has a pair of axially aligned apertures 23 and 24 in its legs and is positioned between the eyebolts 20. Screws 25 are inserted through the heads of the eyebolts 20 and threaded through the apertures 23 and 24 of the bracket 22 until the bracket 22 is securely suspended in a position beneath the A-frame, and so that the base of the U-shaped bracket 22 is substantially parallel with the sides of the vehicle and the wheel backing-plate 28 of the steerable wheels of the vehicle when the steerable wheels are in alignment with the vehicle center line.

A clip 30 is attached to the wheel backing plate 28 in any conventional manner, such as by welding, bolting or riveting.

A compound spring 31 is connected to the hook 30 and threaded onto the base of the U-shaped bracket 22 through its aperture 32. The compound spring 31 comprises a swivel hook 34 having an opening 35 of a size such that it will barely fit over the clip 30. The swivel hook 34 has an enlarged end 36 over which an extension spring of a closed coil helical spring type is attached in the conventional manner, in that the reduced end 39 of the spring 38 surrounds the swivel hook 34 and prevents the removal of its enlarged end 36. The spring 38 is similarly shaped at its end 40. The end 40 of the spring 38 surrounds a link 41 and prohibits the removal of its enlarged end 42.

The link 41 has an enlarged end 43 which is surrounded by a spring 45 having a larger wire diameter than the spring 38. The larger spring 45 is also connected to the swivel bolt 46 at its enlarged end 47. The swivel bolt 46 is connected to the base of the U-shaped bracket 22 by inserting the swivel bolt through the aperture 32, and by threading the bolts 48 and 49 thereon.

Since the spring 38 is of a smaller wire diameter than the larger spring 45, it can be seen that the smaller spring 38 might be over stretched before the larger spring 45 begins to open. Thus, a limiting means 50 is built into the spring 38 so that it can be freely stretched only to a predetermined point. The limiting means 50 comprises a pair of S-shaped brackets inserted inside the main portion of the spring 38. The end 51 of the limiting means 50 is shaped so that it will engage the end 39 of the spring 38 while the end 52 of the limiting means 50 is shaped so that it will engage the main portion of the spring near its end 40. Thus, when the spring 38 is stretched so that its end 39 engages the portion 51 of the limiting means 50 and its body portion near its end 40 engages the portion 52 of the limiting means 50, the spring will no longer stretch, and any further tension in the compound spring 31 will cause the larger spring 45 to open.

*Operation*

The weight of a heavy vehicle constantly exerts pressure on its wheels and tends to cause its wheels to bow outwardly. Also, the constant vibrations and pounding encountered by the wheels of the vehicle further tends to cause the wheels to bow outwardly. In the steerable wheels of an automobile, or the like, the pressures exerted on the steering mechanism becomes critical since any harm done to the steering mechanism might cause it to fail or might cause the steerable wheels to become misaligned, whereupon the tires of the vehicle would wear at a faster rate than normal. However, when the compound spring arrangement 31 is attached between the backing plate 28 and the clamp device 12 a predetermined amount of tension is exerted on the compound spring 31 so that the backing-plate 28 of each wheel has a force exerted thereon at its bottom dead center that tends to pull the bottom dead-center of the backing-plate and, the wheel attached thereto, toward the center of the automobile so that a torque is exerted around the pivot point of the wheel which is approximately equal to the torque exerted on the wheel by the weight of the vehicle. Since the direction of the torque exerted on the backing-plate by the compound spring 31 is of a direction opposite to the direction torque exerted on the wheel by the weight of the vehicle, it can be seen that these two torques tend to cancel out each other so that the steering components of the steerable wheels only feels the weight of the vehicle and the excessive wear normally caused by the torque exerted by the weight of the vehicle is effectively eliminated from the system.

Due to the negative caster in steerable automobile wheels the bottom dead-center of the backing-plate is not in the center line of the kingpin. Thus, the bottom dead-center of the backing-plates is not in its pivot point when it is turned with the wheels so that when the wheels are pivoted to turn the automobile the compound spring 31 will stretch or contract, depending on which direction the wheels are turned. For instance, if the backing plate 28 was attached to the left front steerable wheel of the vehicle, and the wheels of the vehicle were pivoted to the left as if in a left hand turn, the bottom dead-center of the backing-plate would move away from the center line of the automobile, tending to stretch the compound spring 31. Of course, the reverse is true of the right hand wheel when the automobile is in a left hand turn; the bottom dead-center of the backing-plate moving toward the center line of the automobile so that the compound spring 31 would contract.

When an automobile tends to round a curve, for instance a left hand curve, the wheels on the left side of the vehicle tend to be pulled outwardly at their bottom periphery while the wheels on the right hand side of the vehicle tend to be pushed inward at their bottom periphery. Thus, it can be seen that more force is needed on the left wheels of the vehicle by the compound spring 31 to balance the weight of the vehicle and the forces encountered by the vehicle in its left hand turn. Also, less force is required by the compound spring on the bottom of the backing-plate on the right hand wheels. Of course, for a given vehicle speed as the wheels are pivoted further more force is required on the left hand wheels and less force is required on the right hand wheels.

The compound spring 31 is constructed so that as the backing-plate bottom dead-center moves away from the center line of the automobile, more and more pressure will be required to open the first spring 38, until it reaches its fully open position as determined by the limiting means 50. After the spring 38 is fully opened the larger spring 45 begins to open with further movement of the backing-plate 28 away from the center line of the automobile. Thus, it can be seen that, while the centrifugal force effects for a given vehicle speed will increase with the angle of pivot of the steerable wheels the forces exerted by the compound spring will likewise increase so as to offset the centrifugal forces of the vehicle on its steering mechanism. Of course, the converse is true with the steerable wheels on the other side of the vehicle, in that the sharper the wheels are pivoted the smaller the amount of spring forces exerted on the backing-plate, and a smaller amount of forces are required to counteract the torque felt by the steering elements of the vehicle due to the weight of the vehicle.

When the vehicle hits an obstruction in the road, the wheels and their backing-plates tend to move upwardly with respect to the vehicle so that the bottom dead-center of the backing-plate is caused to move away from the eye-bolt 20 thereby stretching the compound spring 31. This, of course, causes the spring to exert more pressure on the bottom dead-center of the backing-plate to pull it toward the center line of the automobile with more force. This same phenomenon is true when the vehicle is more heavily loaded. Therefore, when the wheels are raised upwardly with respect to the vehicle, due to added weight or the vehicle hitting an obstruction in the road, more force is exerted on the backing-plates by the spring so that the extra force due to the added weight of the vehicle causing more torque on the steering components of the steerable wheels is counteracted by the spring. Thus, it can be seen that the compound spring is self adjusting in that it adjusts to the weight added to the vehicle, the vehicles striking an obstruction in its path, or the operation of the vehicle around a curve. Furthermore, the steerable wheels of the vehicle tend to be pulled back into steerable alignment with the non-steerable wheels when the steerable wheels have been pivoted since the spring tension is greater on the wheel pivoted away from the center line of the vehicle than the spring tension on the opposite wheel. Accordingly, if the operator of the vehicle releases the steering wheel the pivotal wheels will tend to return to or maintain their straight ahead or aligned position.

FIG. 3 shows another form of the invention wherein a spring biased shock absorber 60 is susbtituted for the smaller spring 38 in the compound spring 31. The spring biased shock absorber comprises a closed cylinder 61 filled with a fluid, and a piston 62 is slidably positioned therein. The piston 62 has apertures 63 therethrough so that when it is moved from one end toward the other end of the cylinder 61 the fluid on one side of the piston can move through the apertures 63 to the other side of the piston. A spring 64 is positioned between one end of the cylinder 61 and the piston 62, around the shaft 65. The shaft 65 extends through an aperture 66 in the cylinder 61 and is adapted to be connected to the clip 30 on the wheel backing-plate 28. A stem 68 having an enlarged end 69 is attached to the cylinder 61 and is adapted to be received by the larger spring 45, as previously described.

The hydraulic shock absorber functions in a manner similar to the smaller spring 38 in the compound spring 31 in that the spring 64 exerts approximately the same amount of compressible force as exerted in the tension of the spring 38, however, the addition of the function of the shock absorber helps to prevent sudden jolts on the wheels from imparting a sudden torque to the steering components of the vehicle. In other words, the fluid on the spring side of the piston 62 must flow through the apertures 63 before the piston 62 and the rod 65 can be moved to the left of the cylinder 61, as shown in the drawing, which means that any sudden forces exerted on the wheels that tend to pull the backing-plate 28 away from the clamp device 12 will be felt mainly by the larger spring 45, rather than the smaller spring 64 inside the cylinder 61. With this arrangement it can be seen that any sudden jolt felt by the steering mechanism which might exert a large torque on the steering mechanism will be compensated for in that the stronger spring 45 will be forced open, whereas the slower movement of the wheels with respect to the vehicle will be felt, at least at first, by the smaller spring 64. This arrangement prohibits the more damaging sudden shocks to the system from exerting a torque on the system.

In another form of the invention two smaller springs 70 and 71, similar to spring 38 and its limiting means 50, extend between the backing-plate and the larger spring 45. The springs 70 and 71 are positioned near the bottom dead-center of the backing-plate, on each side of the kingpin center line, indicated at 72, so that when the steerable wheel is pivoted, for instance, to the left, the spring 71 will be stretched further than it would have been if positioned at the bottom dead-center of the backing-plate. This feature tends to cause the wheels to be more positively pivoted back into alignment with the non-steerable wheels, or maintained in alignment with the non-steerable wheels if the driver of the vehicle releases the steering wheel. While the wire diameter of the springs 70 and 71 is not as large, in comparison, as that of the spring 38 so that the added tension of the springs is not greater than the spring 45, the fact that the ends of the springs 70 and 71 are offset a substantial distance from the kingpin center line 72 causes the single one of the springs 70 and 71 to exert a greater turning moment around the kingpins center line 72 due to its offset distance therefrom. Of course, when the backing-plate is aligned with the non-steerable wheels the springs 70 and 71 are balanced with each other so that no effective turning moment about the kingpin center line 72 is felt by the steering mechanism.

While it is stated that it is a primary function of the instant invention to keep the wheels in alignment and to prevent the weight of the vehicle and the vibrations thereon from causing the steering mechanism to become worn, it should be understood that when the invention is applied to a vehicle already having worn steering mechanism the wheels will tend to be pulled back into alignment despite the existence of worn steering knuckles or wheel bearings and looseness in the steering gear, and at the same time steering wheel shock and vibration will be minimized.

It will be obvious to those skilled in the art that many variations may be made in the embodiments chosen for the purpose of illustrating the present invention without departing from the scope thereof as defined by the appended claims.

What is claimed is:

1. In a steerable vehicle suspension system of the type having at least one rotatable wheel pivotal about a substantially vertical axis, said vehicle having a frame and said wheel having a backing plate, the combination therewith of a compound spring extending between the lower portion of said backing plate and said frame, said compound spring having a first spring, means for limiting the opening of said first spring, a second spring attached to said first spring and constructed to open after said first spring opens.

2. In a steerable vehicle of the type having a frame, at least one rotatable wheel pivotal about a substantially vertical axis and a backing-plate in close association with said wheel, the combination therewith of a compound spring connected between a lower portion of said backing plate and said frame, said compound spring comprising a first coil tension spring having one end connected to said backing-plate, means for limiting the opening of said first spring, a second coil tension spring connected at one end to said first spring at its end remote from said backing plate, said second spring being connected at its end remote from said first spring to said frame.

3. In a steerable vehicle of the type having a frame, a rotatable wheel pivotally attached to said frame and a backing plate in close association with said wheel, the combination therewith of a first spring means attached at one end to the lower portion of said backing plate, a second spring means of a different strength attached at one end to said first spring means at its end remote from said backing plate, said second spring means being attached at its end remote from said first spring means to said frame, and means for limiting the movement of one of said springs.

4. In a steerable vehicle of the type having a frame and a wheel backing-plate pivotal about an upwardly extending axis, the combination therewith of a resilient means extending between said backing-plate and said frame comprising at least two coil suspension springs of different strengths, the weaker of said springs having means thereon for limiting its expansion.

5. In a steerable vehicle of the type having a frame and a wheel backing-plate pivotal about an upwardly extending axis, the combination therewith of a resilient means extending between the lower portion of said backing-plate and said frame comprising at least one compression spring and one tension spring and means limiting the movement of one of said springs.

6. In a steerable vehicle of the type having a frame and a wheel backing-plate pivotal about an upwardly extending axis, the combination therewith of at least two resilient members of different strengths extending in series between said backing-plate and said frame, one of said resilient members comprising a spring biased shock absorber.

7. In a steerable vehicle of the type having a frame and a wheel backing-plate pivotal about an upwardly extending axis, the combination therewith of a resilient means extending between said backing-plate and said frame comprising a compound spring means having a first tension spring attached at one of its ends to said backing-plate on one side of said axis, a second tension spring attached at one of its ends to said backing-plate on the other side of said axis, a third tension spring attached at one of its ends to said first and second springs at their ends remote from said backing-plate and at its other end to said frame, and means for limiting the expansion of said first and second springs.

8. A method of minimizing wear on the steering components of a steerable vehicle of the type having a frame and a rotatable wheel pivotal about an upwardly extending axis, said method comprising pulling the bottom of the wheel toward the centerline of the vehicle with a force approximately equal to the outward force exerted thereon by the weight of the vehicle, gradually increasing the force when the bottom of the wheel is moved away from the centerline and abruptly increasing the force when the bottom of said wheel is moved away from the centerline a predetermined distance.

References Cited

UNITED STATES PATENTS

| | | |
|---|---|---|
| 593,788 | 11/1897 | Stone. |
| 1,037,908 | 9/1912 | Herman _____ 267—60 |
| 1,064,111 | 6/1913 | Tower _____ 280—94 |
| 1,556,717 | 10/1925 | Robinson. |
| 1,640,388 | 8/1927 | Williams _____ 280—94 |
| 1,928,816 | 10/1933 | Grayson _____ 280—90 |
| 2,993,704 | 7/1961 | Worsham. |
| 3,230,024 | 1/1966 | Gika _____ 267—1 X |

KENNETH H. BETTS, *Primary Examiner.*